US009971973B1

(12) United States Patent
Smith et al.

(10) Patent No.: US 9,971,973 B1
(45) Date of Patent: May 15, 2018

(54) ARTIFICIAL INTELLIGENCE SYSTEM FOR TRAINING A CLASSIFIER

(71) Applicant: Applied Underwriters, Inc., Omaha, NE (US)

(72) Inventors: Justin N. Smith, Woodside, CA (US); David Alan Clark, San Mateo, CA (US)

(73) Assignee: Applied Underwriters, Inc., Omaha, NE (US)

( * ) Notice: Subject to any disclaimer, the term of this patent is extended or adjusted under 35 U.S.C. 154(b) by 85 days.

(21) Appl. No.: 15/161,452

(22) Filed: May 23, 2016

(51) Int. Cl.
| G06F 17/00 | (2006.01) |
| G06N 99/00 | (2010.01) |
| G06F 17/30 | (2006.01) |
| G06N 7/00 | (2006.01) |

(52) U.S. Cl.
CPC ..... *G06N 99/005* (2013.01); *G06F 17/30477* (2013.01); *G06N 7/005* (2013.01)

(58) Field of Classification Search
CPC .................................................. G06N 99/005
USPC ...................................................... 706/15, 45
See application file for complete search history.

(56) References Cited

U.S. PATENT DOCUMENTS

| 8,024,280 | B2 | 9/2011 | Jessus et al. |
| 8,280,828 | B2 | 10/2012 | Perronnin et al. |
| 8,521,679 | B2 | 8/2013 | Churchill et al. |
| 8,543,520 | B2 | 9/2013 | Diao |
| 8,725,660 | B2 | 5/2014 | Forman et al. |
| 8,799,190 | B2 | 8/2014 | Stokes et al. |
| 8,805,769 | B2 | 8/2014 | Ritter et al. |
| 8,843,422 | B2 | 9/2014 | Wang et al. |
| 8,954,360 | B2 | 2/2015 | Heidasch et al. |
| 9,015,089 | B2 | 4/2015 | Servi et al. |
| 9,229,930 | B2 | 1/2016 | Sundara et al. |
| 2008/0109272 | A1 | 5/2008 | Sheopuri et al. |
| 2009/0132445 | A1 | 5/2009 | Rice |
| 2013/0124447 | A1 | 5/2013 | Badros et al. |
| 2013/0311419 | A1 | 11/2013 | Xing et al. |
| 2014/0201126 | A1* | 7/2014 | Zadeh ............... G06K 9/627 706/52 |

(Continued)

OTHER PUBLICATIONS

Scatter Plot Smoothing, https://stat.ethz.ch/R-manual/R-devel/library/stats/html/lowess.html, last viewed Apr. 7, 2016.

(Continued)

*Primary Examiner* — David R Vincent
(74) *Attorney, Agent, or Firm* — Mark Nowotarski

(57) ABSTRACT

An artificial intelligence system for training a classifier has a database of training data and a modeling system for building a classification model based on the training data. The database has a binary classification for each entity and binary tokens indicating whether or not one or more indicators about the entity are true. The classification model is based on a tempered indication of the tokens. The tempered indication is a ratio of a weighted sum of the tokens for each entity divided by a tempering factor for each of the entities. The tempering factor is a function of the unweighted sum of the tokens for each entity. Thus the tempering factor will reduce the tempered indication when large numbers of low weight tokens are present so that the model does not over predict the probability of an entity being in the classification.

9 Claims, 4 Drawing Sheets

(56) References Cited

U.S. PATENT DOCUMENTS

2014/0297403 A1   10/2014  Parsons et al.
2015/0032676 A1   1/2015   Smith et al.
2015/0120631 A1   4/2015   Serrano Gotarredona et al.
2015/0127591 A1   5/2015   Gupta et al.
2015/0242749 A1   8/2015   Carlton
2015/0286930 A1   10/2015  Kawanaka et al.

OTHER PUBLICATIONS

Wikipedia, Bayesian network, https://en.wikipedia.org/wiki/Bayesian_network, last viewed Mar. 21, 2016.
Wikipedia, Belief revision, https://en.wikipedia.org/wiki/Belief_revision, lasted viewed Mar. 21, 2016.
Wikipedia, Local regression, https://en.wikipedia.org/wiki/Local_regression, last viewed Apr. 4, 2016.
Wikipedia, Monotonic function, https://en.wikipedia.org/wiki/Monotonic_function, last viewed Mar. 21, 2016.
Wikipedia, Semantic network, https://en.wikipedia.org/wiki/Semantic_network, last viewed Mar. 21, 2016.
Wikipedia, Logistic regression, https://en.wikipedia.org/wiki/Logistic_regression, last viewed Mar. 28, 2016.
Wikipedia, Reason maintenance, https://en.wikipedia.org/wiki/Reason_maintenance, last viewed Mar. 21, 2016.
European Journal of Operational Research 176 (2007) 565-583; O.R. Applications, Strategies for detecting fraudulent claims in the automobile insurance industry; available online at sciencedirect.com, Jan. 1, 2007.

* cited by examiner

ARTIFICIAL INTELLIGENCE SYSTEM FOR TRAINING A CLASSIFIER

COPYRIGHT AND TRADEMARK NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

FIELD OF THE INVENTION

Embodiments of the present invention relate to artificial intelligence systems for training classifiers.

BACKGROUND OF THE INVENTION

There are numerous reasons for classifying entities. Binary classification indicates whether or not an entity is in a particular class. Classification can be done based on the publications of an entity. This can include social media publications. The social media publications are analyzed for the presence of indicators. The indicators might be key words. The presence or absence of an indicator might be digitally stored as a binary value of 1 if said indicator is present and a binary value of 0 if said indicator is not present. Prior art systems have assigned different weights to different indicators. This recognizes that some indicators are stronger than others. It has been discovered, however, that when there is a large number of low weight indicators in an entity's publications, prior art systems tend to over predict the probability that an entity is in a particular class. There is need, therefore, for an artificial intelligence system for training a classifier that will not over predict due to large numbers of low weight indicators.

SUMMARY OF THE INVENTION

The summary of the invention is provided as a guide to understanding the invention. It does not necessarily describe the most generic embodiment of the invention or the broadest range of alternative embodiments.

A system for training a classifier has a database of training data and a modeling system for building a classification model based on the training data. The database has a binary class for each entity and binary tokens indicating whether or not one or more indicators about the entity are true. The classification model is based on a tempered indication of the tokens. The tempered indication is a ratio of a weighted sum of the tokens for each entity divided by a tempering factor. The tempering factor is a function of the unweighted sum of the tokens for each entity. Thus the tempering factor will reduce the indication when large numbers of low weight tokens are present so that the model does not over predict the probability of an entity being in a class.

DETAILED DESCRIPTION

The detailed description describes non-limiting exemplary embodiments. Any individual features may be combined with other features as required by different applications for at least the benefits described herein.

As used herein, the term "about" means plus or minus 10% of a given value unless specifically indicated otherwise.

As used herein, a "computer-based system", "computer system", "database" or "engine" comprises an input device for receiving data, an output device for outputting data, a permanent memory for storing data as well as computer code, and a microprocessor for executing computer code. The computer code resident in said permanent memory will physically cause said microprocessor to read-in data via said input device, process said data within said microprocessor, and output said processed data via said output device.

As used herein a "binary value" is any type of computer data that can have two states. Said data may be, but is not limited to, a bit, an integer, a character string, or a floating point number. A binary value of "1" or "true" is interpreted as the number 1 for arithmetic calculations. A binary value of "0" or "false" is interpreted as the number 0 for arithmetic calculations.

As used herein, the symbols "i" and "j" refer to index numbers for one of a plurality of objects. Thus the term "entity j" refers to a $j^{th}$ entity in a plurality of said entities. The term "token i" refers to an $i^{th}$ token in a plurality of said tokens.

Figure 1:
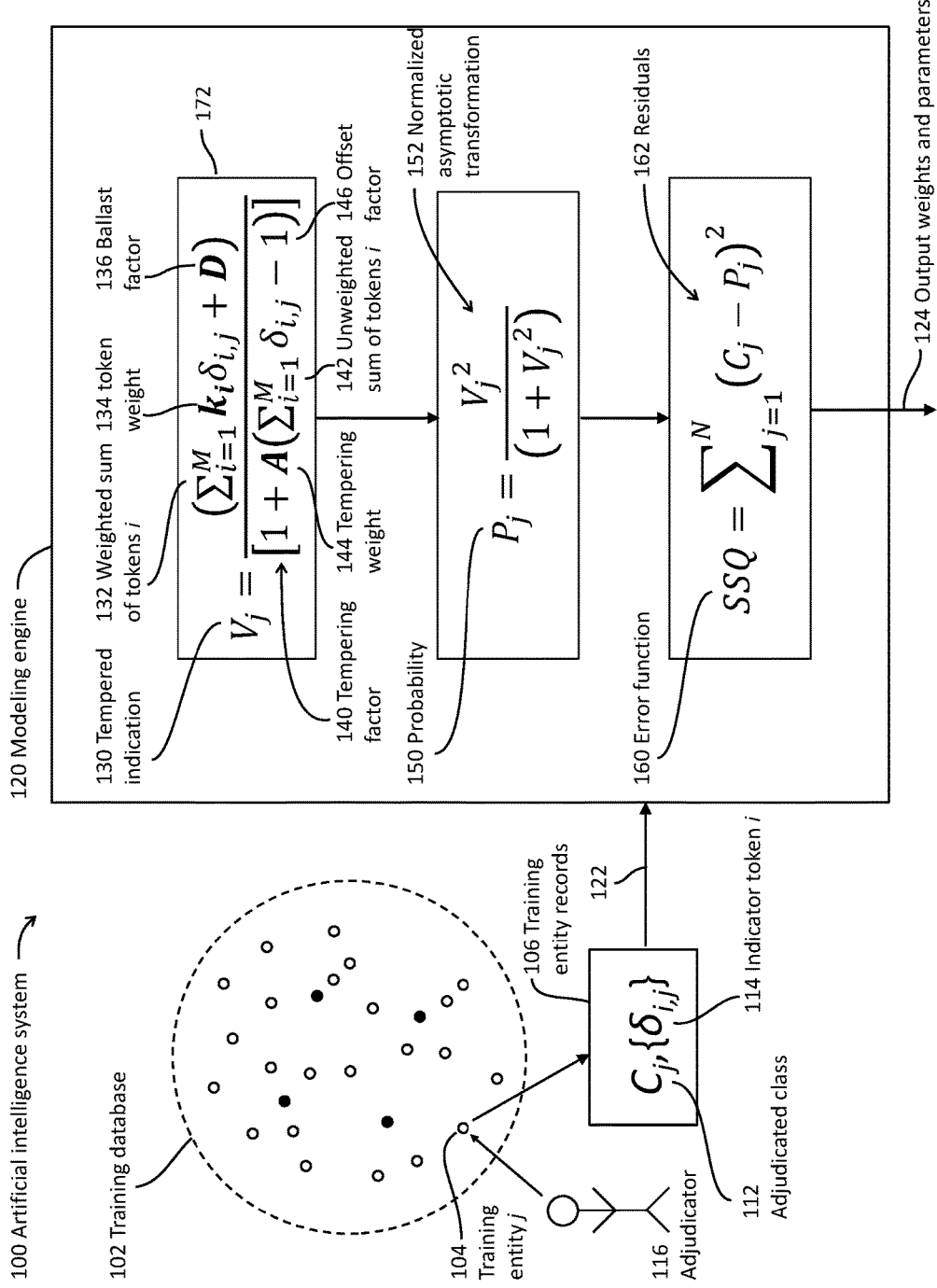
FIG. 1 is an illustration of an artificial intelligence system for training a classifier.

As used herein the term "adjudicated class" means that a classification that has been done independently, in at least some respect of the data, used to train a classifier. Referring to FIG. 1, an adjudicator 116, may classify an entity 104 into an adjudicated class $C_j$ (item 112). The adjudicator may be a natural person, automated system or combination of both.

FIG. 1 is an illustration of an artificial intelligence system 100 for training a classifier. The system comprises a computer implemented training database 102 and a computer implemented modeling engine 120. The training database comprises a plurality of N training entity records 106. Each of said records comprises an adjudicated binary class $C_j$ (item 112) of an entity j (item 104). The binary class has a binary value of 1 when said class is true and a binary value of 0 when said class is false. Each training entity record also comprises a plurality of M indicator tokens i, (item 114) for said entity j. "i" is an index number for the different tokens. The total number of tokens is M. "j" is an index number for the different entities. The total number of entities is N. $\{\delta_{i,j}\}$ represents the plurality of tokens $\delta_{i,j}$ in each training entity j. A token is a binary indication of the presence or absence of an indicator in a publication by an entity. The publication may be a social media publication or any publication under the control of the entity, such as text messages, emails, magazine articles, etc. The indicator may be any aspect of the publication, such as words, phrases, word stems, pictures, videos, font, audio or graphic layout. The binary indication has a binary value of 1 when said indication is true (i.e. is present in the publication) and a binary value of 0 when said indication is false (i.e. is not present).

The computer implemented modeling engine 120 comprises a microprocessor and computer readable instructions stored on a permanent memory. The computer readable instructions are operable to cause said microprocessor to physically carry out the steps of:

a) read in 122 said plurality of training entity records 106 from said training database 102;

b) calculate for each entity j a tempered indication 130 of said class, said tempered indication being based on:
   i) the ratio of a weighted sum 132 of said tokens i associated with said entity j and a tempering factor 140, said tempering factor being a function of an unweighted sum of said tokens i (item 142) associated with said entity j;
   ii) one or more weights 134 associated with each of said tokens i in said weighted sum; and
   iii) one or more tempering parameters 136, 144, 146 associated with either said weighted sum or said tempering factor;

c) calculate for each entity j a probability 150 of said class having a binary value of 1 wherein said calculation of said probability comprises a normalized asymptotic transformation 152 of said tempered indication for said entity j, said normalized asymptotic transformation having an asymptotic value of 1 for large values of said tempered indication;

d) calculate for each entity j a residual 162, said residual being the difference between said binary value of said adjudicated class of said entity j and said probability of said class of said entity j having a binary value of 1;

e) calculate an error function 160 of said residuals for all of said entities j;

f) calculate values for said token weights and said one or more tempering parameters that minimize said error function; and g) output 124 said values of said token weights and said one or more tempering parameters in tangible form. Said tangible form may be stored in computer readable format on a permanent memory.

The output is useful for an automated classification system that will read in token data for prospective entities and use said model for determining a probability of said prospective entity being in said class.

FIG. 1 illustrates a particular function 172 for determining a tempered indication, but said invention is not limited to said particular function. Any function that meets the above referenced criteria may be used. In this example, the particular function includes the logic that the tempered indication is set to 0 when none of the indicators are present in an entity's data (i.e. all of the tokens have a binary value of 0).

The tempering factor has a value of 1 when there is only one indicator found in an entity's data (i.e. the unweighted sum of said tokens i for said entity j has a value of 1). This is the function of the offset factor 146.

The formula for the tempered indication shown in FIG. 1 has a tempering weight A. This weight indicates how much the tempering factor increases with each increase in the unweighted sum of the tokens. A value of A of 0.1 or less is suitable. The formula for the tempered indication also has a ballast factor 136 that is added to the weighted sum. The ballast factor may be positive or negative.

In order to compare the tempered indication to a binary class, the tempered indication may be transformed to a real value between 0 and 1 by a normalized asymptotic transformation. A particular normalized asymptotic transformation 152 is shown in FIG. 1. This particular transformation has been found to be effective when the indicators are words, phrases or word stems found in an entity's social media data. This transformation is an example of a long tail transformation relative to a logistic transformation. Any long tail transformation may be effective. The combination of the long tail transformation and the tempering factor substantially reduce the impact of a large number of low weight tokens being in an entity's data.

A particular function 162 is shown for calculating an error function. This function is the unweighted sum of squares (i.e. "SSQ") of the residuals. Any error function, however, may be used that provides an aggregate measure of how well the model fits the data. An alternative error function might be a weighted sum of squares of the residuals where the weights are related to size or importance of the training entities j relative to each other.

Figure 2:
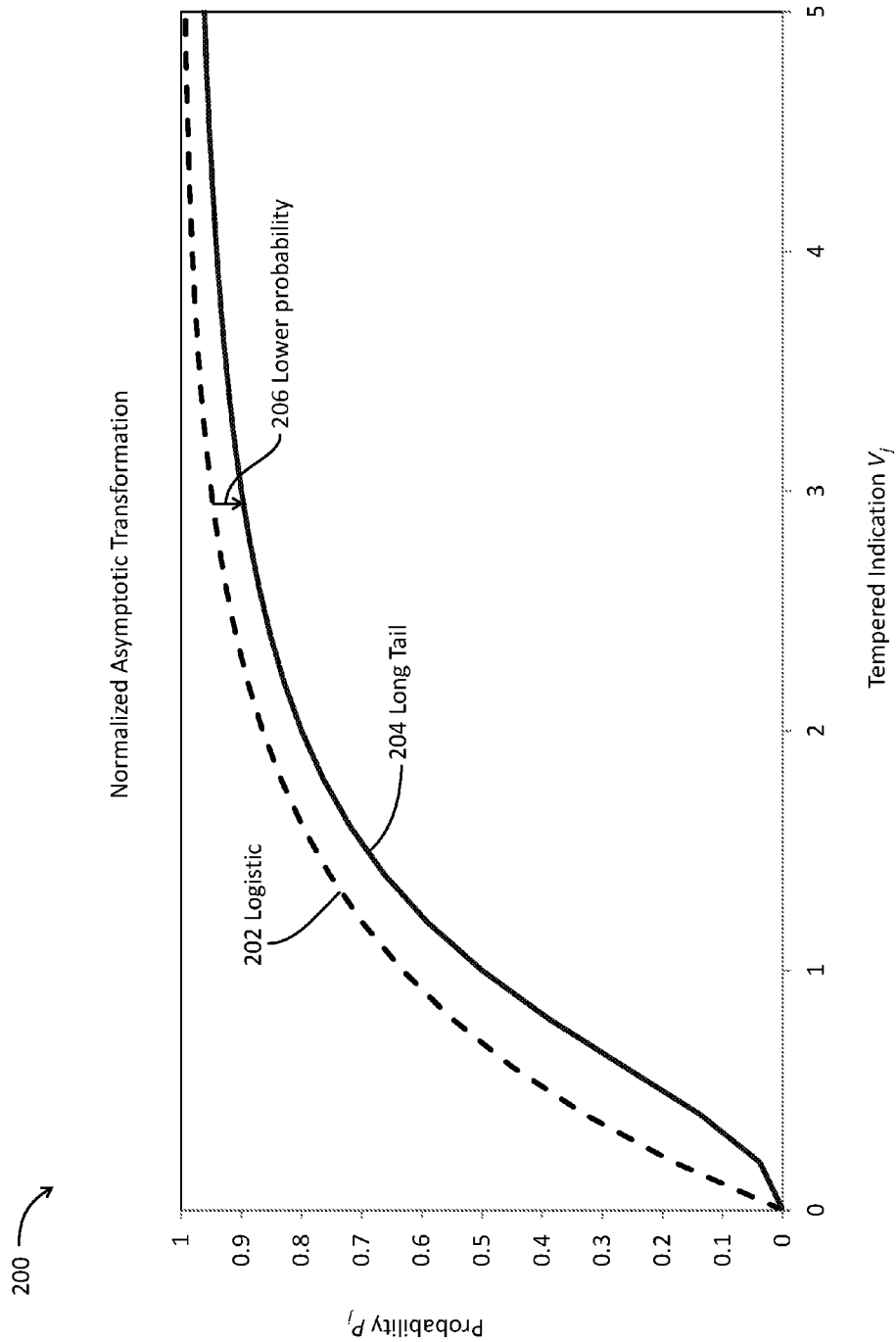
FIG. 2 is a graph of exemplary normalized asymptotic transformations.

FIG. 2 is a graph 200 of two exemplary normalized asymptotic transformations 202, 204. A logistic transformation 202 is presented in comparison to a long tail transformation 204. As used herein, a normalized asymptotic transformation is long tailed if it has a lower value 206 than the logistic transformation at higher values of the transformed variable (e.g. the tempered indication).

Example

A set of 100 entities were adjudicated to determine which class they belonged to. The social media sites of the entities were then analyzed to identify the presence or absence of six words indicative of said class. The class of each entity j was associated with an event date. The dates of the publications used for each entity was after each entity's event date. The classes and indicator tokens were then stored in a training database. A modeling engine then read the data in. The token weights and tempering parameters of a tempered indication where then calculated based on the model shown in FIG. 1.

Figure 3:
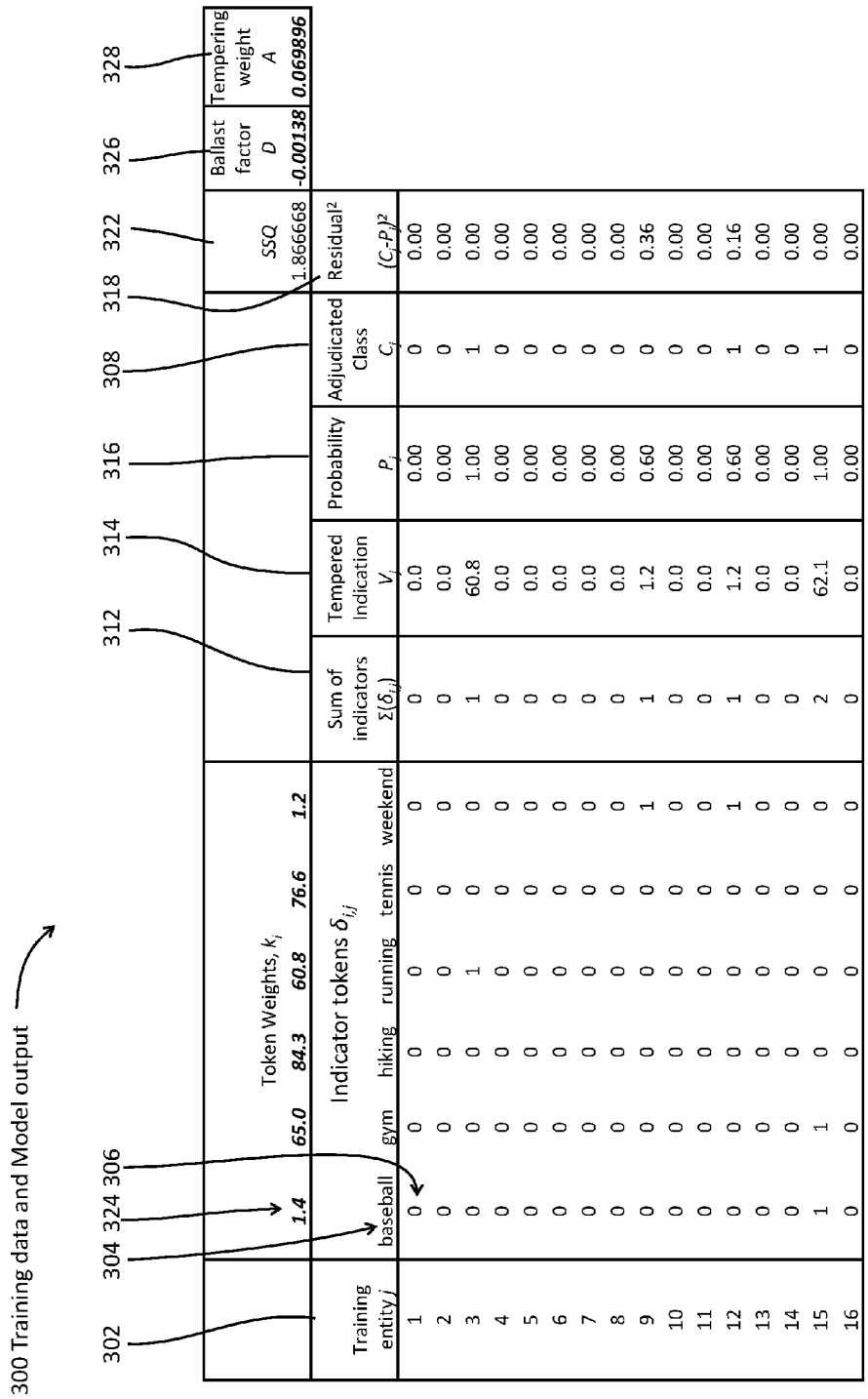
FIG. 3 is an example of the training data and associated output of a modeling system.

FIG. 3 is an example of a portion of the 300 training data and model output of the example. The indicators 304, tokens 306 and adjudicated classes 308 are shown for a portion of the training entities 302. The calculated token weights 324 and tempering parameters 326, 328 are shown. The weights and parameters were calculated to minimize the sum of squares 322 of the residuals. The square of the residuals 318 are shown in the table. The values of the tempered indications 314, their sums 312, and associated probabilities 316 are shown for the token weights and tempering parameters illustrated that minimized the sum of squares of the residuals.

Figure 4:
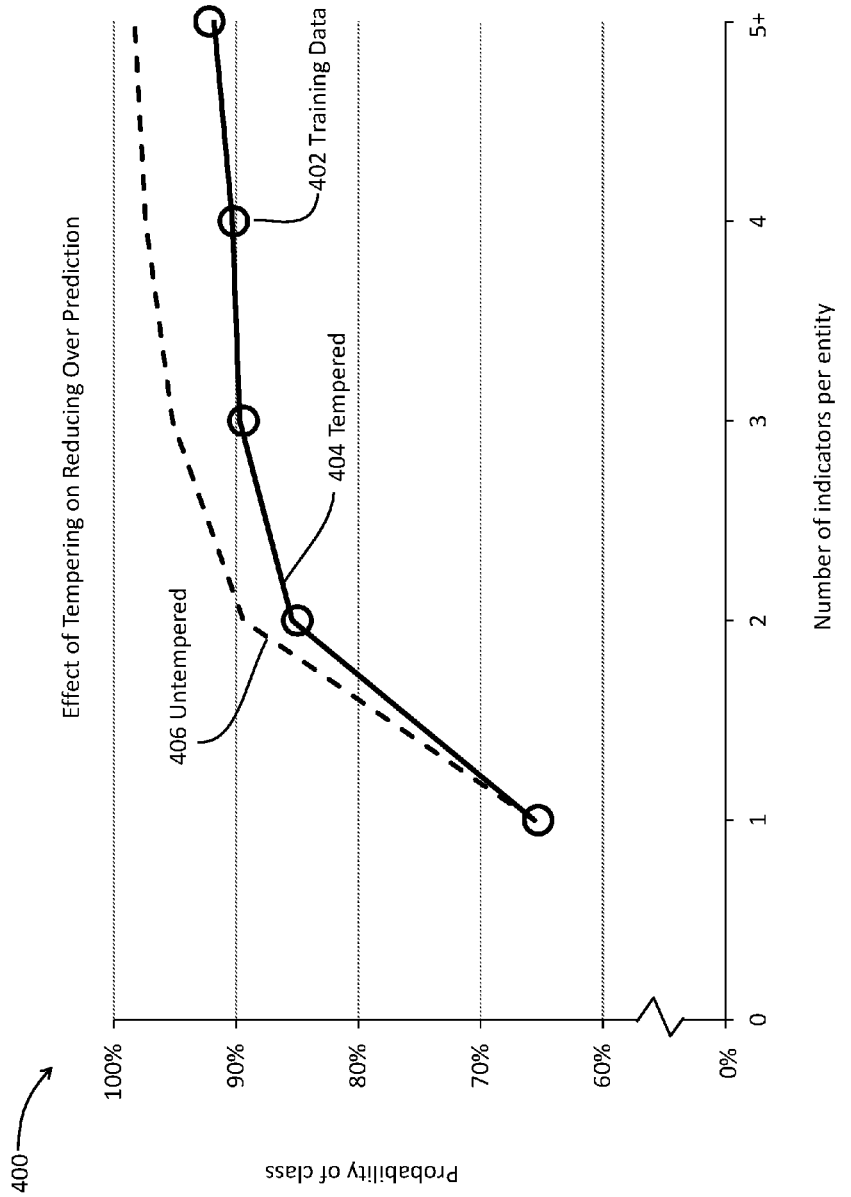
FIG. 4 is a graph showing how tempering reduces over prediction.

FIG. 4 is a graph 400 showing the effect of tempering on reducing over prediction. The probability of an entity being in the class is shown versus the number of indicators per entity. The training data 402 is shown as data points. The probability values calculated according to the tempered model 404 are shown as a solid line. The probability values calculated with an untempered model 406 are shown as a dashed line. The tempered model shows accurate prediction of the probabilities. The untempered model over predicts.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention. For example, the methods described herein may be applied to multi-valued or even scalar classes of entities. They can also be extended to tokens that are scalars, such as the number of times a particular indicator is present in a publication, or the degree to which an indicator is present.

We claim:

1. An artificial intelligence system for training an automated classification system, said artificial intelligence system comprising:
   a) a computer implemented training database comprising a plurality of training entity records, each of the records comprising:
   i) an adjudicated binary class of an entity j, the binary class having a binary value of 1 when the class is true and a binary value of 0 when the class is false; and
   ii) a plurality of class indicator tokens i for the entity j, each of the tokens being a binary indication of the presence or absence of an indicator i in a social media publication by the entity j, the binary indication having a binary value of 1 when the indication is true and a binary value of 0 when the indication is false; and
   b) a computer implemented modeling engine comprising:
   i) an input device, an output device, a permanent memory, a microprocessor; and
   ii) computer readable instructions stored on the permanent memory, the computer readable instructions operable to cause the microprocessor to carry out the steps of:
   1) read in by the input device the plurality of training entity records from the training database;
   2) calculate by the microprocessor for each entity j a tempered indication of the class, the tempered indication being based on:
   a) the ratio of a weighted sum of the tokens i associated with the entity j and a tempering factor, the tempering factor being a function of an unweighted sum of the tokens i associated with the entity j;
   b) one or more weights associated with each of the tokens i in the weighted sum; and
   c) one or more tempering parameters associated with either the weighted sum or the tempering factor;
   3) calculate by the microprocessor for each entity j a probability of the class having a binary value of 1, wherein the calculation of the probability comprises a normalized asymptotic transformation of the tempered indication, the normalized asymptotic transformation having an asymptotic value of 1 for large values of the tempered indication;
   4) calculate by the microprocessor for each entity j a residual, the residual being the difference between the binary value of the class and the probability of the class having a binary value of 1;
   5) calculate by the microprocessor an error function of the residuals for all of the entities;
   6) calculate by the microprocessor values for the token weights and the one or more tempering parameters that minimize the error function; and
   7) output by the output device the token weights in a table format and the one or more tempering parameters in a computer readable form to a permanent memory such that said token weights and one or more tempering parameters can be used by said automated classification system to read in token data for a prospective entity and use a model based on said token weights and tempering parameters for determining a probability of said prospective entity being in said class, wherein the class of each entity j is associated with an event date, and the social media publication for the entity j has a publication date after the event date.

2. The artificial intelligence system of claim 1 wherein the tempered indication is set to a value of 0 when all of the tokens for the entity j have a binary value of 0.

3. The artificial intelligence system of claim 1 wherein the tempering factor is set to a value of 1 when the unweighted sum of the tokens for the entity j has a value of 1.

4. The artificial intelligence system of claim 3 wherein:
   a) the tempering parameters comprise a tempering weight; and
   b) the tempering factor increases by the tempering weight when the unweighted sum of the tokens for the entity j increases by 1.

5. The artificial intelligence system of claim 4 wherein the tempering weight has a value of 0.1 or less.

6. The artificial intelligence system of claim 1 wherein:
   a) the tempering parameters comprise a ballast factor; and
   b) the ballast factor is added to the weighted sum.

7. The artificial intelligence system of claim 1 wherein the asymptotic transformation is a long tail transformation relative to a logistic transformation.

8. The artificial intelligence system of claim 1 wherein the indicators comprise words, phrases or word stems.

9. The artificial intelligence system of claim 1 wherein the error function is a sum of squares of the residuals.

* * * * *